United States Patent
Scholl et al.

(10) Patent No.: US 12,236,573 B2
(45) Date of Patent: Feb. 25, 2025

(54) OPTICAL END-POINTING FOR INTEGRATED CIRCUIT DELAYERING; SYSTEMS AND METHODS USING THE SAME

(71) Applicant: Battelle Memorial Institute, Columbus, OH (US)

(72) Inventors: Jonathan Scholl, Oakwood, OH (US); Nicholas Darby, Columbus, OH (US); Joshua Baur, Dublin, OH (US)

(73) Assignee: Battelle Memorial Institute, Columbus, OH (US)

( * ) Notice: Subject to any disclaimer, the term of this patent is extended or adjusted under 35 U.S.C. 154(b) by 443 days.

(21) Appl. No.: 17/539,333

(22) Filed: Dec. 1, 2021

(65) Prior Publication Data
US 2022/0180505 A1    Jun. 9, 2022

Related U.S. Application Data

(60) Provisional application No. 63/121,193, filed on Dec. 3, 2020.

(51) Int. Cl.
| | | |
|---|---|---|
| *G06T 7/00* | (2017.01) | |
| *G01N 1/32* | (2006.01) | |
| *G06T 7/90* | (2017.01) | |

(52) U.S. Cl.
CPC .......... *G06T 7/0008* (2013.01); *G01N 1/32* (2013.01); *G06T 7/90* (2017.01);
(Continued)

(58) Field of Classification Search
CPC .......... G01N 1/32; G06T 7/90; G06T 7/0002; G06T 7/001; G06T 2207/30148
(Continued)

(56) References Cited

U.S. PATENT DOCUMENTS

| 6,146,541 A * | 11/2000 | Goldstein | H01L 22/12 216/2 |
| 2012/0021672 A1* | 1/2012 | David | B24B 49/12 451/6 |

(Continued)

OTHER PUBLICATIONS

Justin Henrie et al., Electronic Color Charts For Dielectric Films on Silicon, Optics Express, Apr. 5, 2004, pp. 1464-1469, vol. 12, No. 7.

(Continued)

*Primary Examiner* — Jamares Q Washington
(74) *Attorney, Agent, or Firm* — Grossman, Tucker, Perreault & Pfleger, PLLC; Donald G. Weiss

(57) ABSTRACT

Systems for determining an end-point of a delayering process using optical end-point detection are described. In embodiments, the systems include a controller with an optical end-pointing (OE) module that is configured to determine an end-point of a delayering process based at least in part on the color or thickness of a surface layer of an integrated circuit (IC). In embodiments, the OE module determines whether an end-point of the delayering process has been reached based at least in part on a comparison of a determined thickness of an IC surface layer to a target thickness. The thickness of the surface layer may be determined by the OE module using a machine learning model, such as a convolutional neural network. Methods of identifying an end-point of a delayering process are also described.

20 Claims, 6 Drawing Sheets

(52) U.S. Cl.
CPC ............... *G06T 2207/20081* (2013.01); *G06T 2207/20084* (2013.01); *G06T 2207/30148* (2013.01)

(58) Field of Classification Search
USPC .................................................. 382/156, 145
See application file for complete search history.

(56) References Cited

U.S. PATENT DOCUMENTS

2020/0356718 A1* 11/2020 Chu ......................... G06N 3/08
2021/0287938 A1* 9/2021 Morgan-Jones .............................
H01L 21/76865

OTHER PUBLICATIONS

Jonathan Scholl et al., Dielectric Film Thickness Measurement Via A Convolutional Neural Network For Integrated Circuit Delayering End Point Detection, 2021, ISTFA.

* cited by examiner

Color SiO$_2$ on Si vs SiO$_2$ Film Thickness (nm)

OPTICAL END-POINTING FOR INTEGRATED CIRCUIT DELAYERING; SYSTEMS AND METHODS USING THE SAME

TECHNICAL FIELD

The present disclosure relates to optical end-point detection for integrated circuit (IC) delayering and, more particularly, to systems and methods for delayering integrated circuits using optical end-point detection.

BACKGROUND

Integrated circuit (IC) delayering is a process by which layers of an IC are removed to provide the ability to physically inspect and/or access IC hardware. Currently, IC delayering processes are time intensive and heavily dependent on operator skill and experience. Modern delayering processes typically involve processing an IC device for a set period of time, after which the device is inspected by a skilled technician to determine if the delayering is satisfactory. For example, IC delayering processes often require a technician to methodically remove material from IC sample in a controlled manner and to pause the process at specific end-points to enable imaging of specific layers of the sample with optical and/or electronic microscopes.

Due to the minute nature of the structure of modern IC's, IC delayering processes are often painstakingly slow, as technicians need to carefully remove enough overlying material to permit imaging of a desired layer of the IC, while not damaging the layer of the IC that is to be imaged. Consequently, it may take a skilled technician, tens to hundreds of hours to use such processes to fully delayer a single IC device. A delayering technician is also generally highly trained to recognize when a delayering process has reached a desired endpoint. Despite such training, undesirable variations in the outcome of a delayering process may result due to differences in the skill level between technicians and pragmatic challenges in determining when an appropriate endpoint has been reached using human senses. Although automated delayering systems using mass spectroscopy and optical spectroscopy have been developed, such systems are very expensive and still require substantial technician involvement.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

Integrated Circuit (IC) delayering is a process by which an IC is deconstructed—layer by layer—to allow inspection of or physical access to IC hardware. Generally, an IC delayering process involves carefully removing material from one or more layers of an IC using physical or chemical processes, thereby exposing underlying features of the IC. For example, physical processes such as lapping, ion milling, electron milling, polishing, etc. can be used to remove layers of dielectric and/or other materials from an IC and thus expose underlying features. Similarly, chemical processes such as reactive ion etching, plasma polishing/etching, chemical etching, and the like can also be used to remove all or a portion of dielectric and other materials layers from an IC.

Due to the minute scale of modern IC's, delayering processes must be carefully performed to remove overlying material layers without damaging or destroying underlying features that may be of interest. With that in mind, modern delayering processes often involve processing an IC for a set time-period to remove material from one or more overlying layers of the IC to expose an underlying layer of the IC that is to be inspected. During such process, the removal of material from the IC is frequently stopped so that the IC can be inspected by a skilled technician to determine whether the delayering process has reached a desired endpoint, i.e., that sufficient material has been removed from the IC to allow desired features to be imaged and/or accessed. If not, the process is repeated until the desired features can be imaged and/or accessed. Each delayering process performed in modern IC delayering processes is deliberately careful and slow to avoid damaging or destroying features of the IC that are of interest. As a result, it can take tens or hundreds of hours for a skilled technician to fully delayer a single IC device. Historically, such processes have also not been suitable for automation.

The present disclosure generally relates to optical end-point detection for integrated circuit (IC) delayering and, more particularly, to systems and methods for delayering integrated circuits using optical end-point detection. In this context, the term "optical end-point detection" refers to the use of color and optionally the thickness of a target (e.g., surface) layer of an IC to determine whether a desired end-point a delayering process has been reached.

Figure 1A:
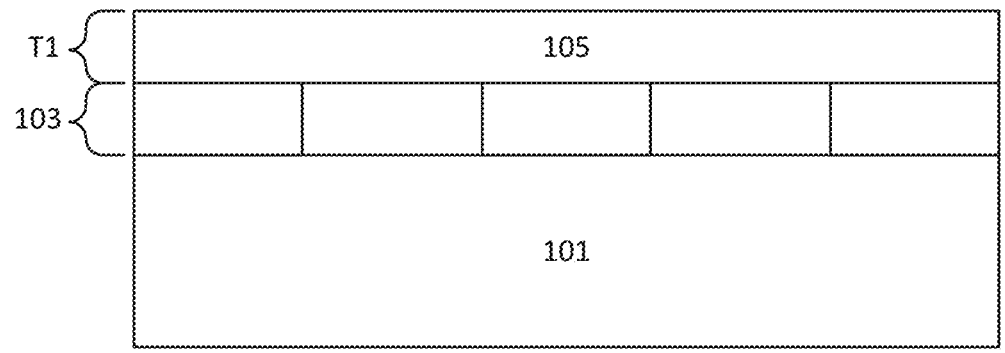
FIGS. 1A-1C stepwise illustrate an IC as it undergoes an example delayering process.

The inventors of the instant application have recognized that the color of material layers used in an IC often depend on their thickness. In particular, the color of dielectric layers (e.g., SiO, $SiO_2$, $SiO_x$ layers) used in integrated circuits is often dependent on the thickness of such layers. To illustrate this concept reference is made to FIGS. 1A-1C, which stepwise illustrate one example of a delayering process that is used to remove a dielectric layer from an upper surface of an IC. As shown in FIG. 1A, IC 100 includes a substrate 101, an IC layer 103 including one or more traces and/or vias (not labeled), and an overlying dielectric layer 105. The dielectric layer 105 may be formed from any suitable material, and in some embodiments is formed from or includes SiO, $SiO_2$, $SiO_x$, or a combination thereof. Without limitation, dielectric layer 105 is preferably $SiO_2$. Although the specific color-thickness relationship varies between different materials used in IC's, the optically visible effect is exhibited by many different IC materials. As such, the techniques described herein are applicable to delayering processes that involve removal of many different types of IC materials.

As shown in FIG. 1A, dielectric layer 105 has an initial thickness T1, which may be any suitable thickness (e.g., 5 to 1000 nanometers (nm) or more). Notably at thickness T1, dielectric layer 105 is a first color C1 (which may be clear or any color in the visible region of the spectrum). Without limitation, C1 is preferably a color in the visible region of the electromagnetic spectrum (i.e., within the wavelength range of about 350 to about 780 nm).

Figure 1B:
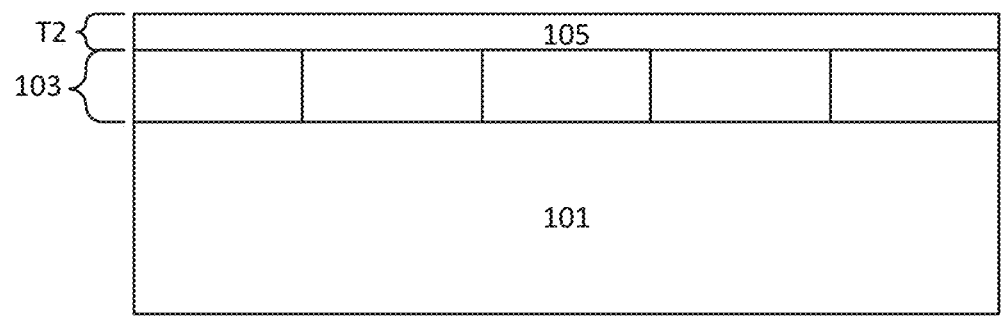

During a delayering process IC 100 may be subject to one or more physical or chemical processes to remove dielectric layer 105 to expose IC layer 103. For example, IC 100 may be subject to one or more of lapping, ion milling, reactive ion etching, plasma polishing/etching, chemical etching, chemical mechanical polishing, etc. combinations thereof, and the like, to reduce the thickness of (and eventually remove) dielectric layer 105. To avoid damaging dielectric layer 105, such processes may be performed slowly and/or iteratively, to gradually remove dielectric layer 105 with little or no impact on IC layer 103. For example, IC 100 may be subject to a first delayering process that reduces the thickness of dielectric layer 105. That concept is shown in FIG. 1B, which depicts IC 100' after the execution of a first delayering process. As shown, dielectric layer 105 of IC 100' has a thickness T2 following the first delayering process, wherein T2<T1. Notably at thickness T2, dielectric layer 105 may be a second color C2, wherein C2 is different from C1.

Figure 1C:
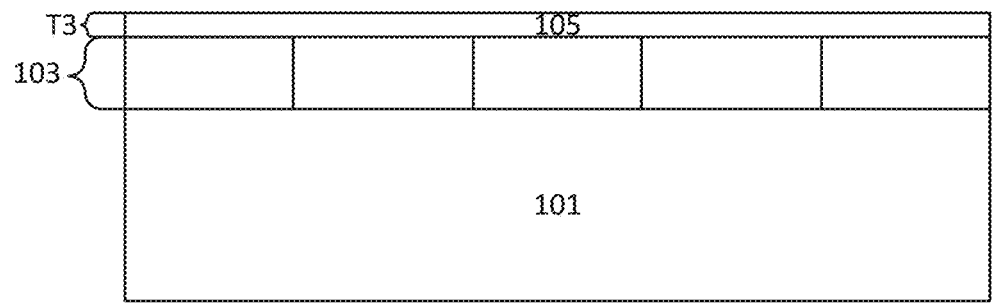

Following the first delayering process, IC 100' may be subject to a second delayering process to further reduce the thickness of dielectric layer 105. This concept is shown in FIG. 1C, which depicts IC 100" following a second delayering process. As shown, dielectric layer 105 in IC 100" has a thickness T3, wherein T3<T2<T1. Notably at thickness T3, dielectric layer 105 may be a third color C3, wherein C3 is different from C1 and C2.

Figure 4:
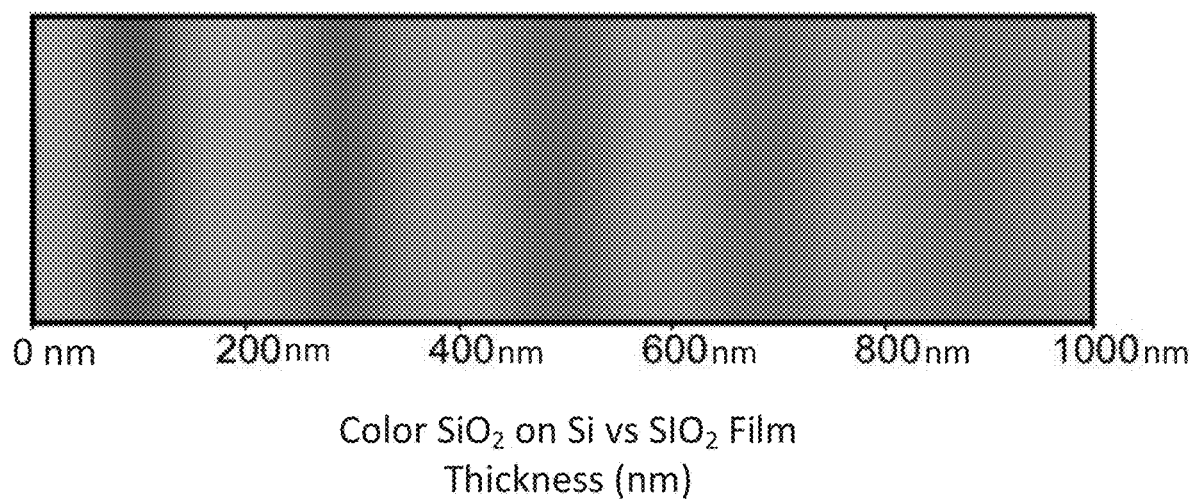
FIG. 4 is a prior art image depicting the color of a film of $SiO_2$ on Si as a function of $SiO_2$ film thickness.

To further illustrate the color-thickness relationship of many IC materials reference is made to FIG. 4, which is an image showing the color of an $SiO_2$ film on Si in the visible region of the electromagnetic spectrum, relative to the thickness of the $SiO_2$ film. As shown, as the thickness of an $SiO_2$ film increases from greater than 0 to 1000 nanometers, the color of the film changes—with blue, gray, yellow, violet, and other hues appearing and disappearing as the thickness of the film changes. Further details are provided in Henrie et al., "Electronic color charts for dielectric films on silicon," Optics Express, Vol. 12, No. 7 (Apr. 5, 2004), the entire content of which is incorporated herein by reference.

As may be understood from the foregoing description, the color of dielectric and other material layers used in IC's may change as a function of their thickness. As discussed below, the present disclosure utilizes that principal to enable systems and methods that utilize optical end-point detection to determine when a delayering process/operation should be terminated.

Figure 2:
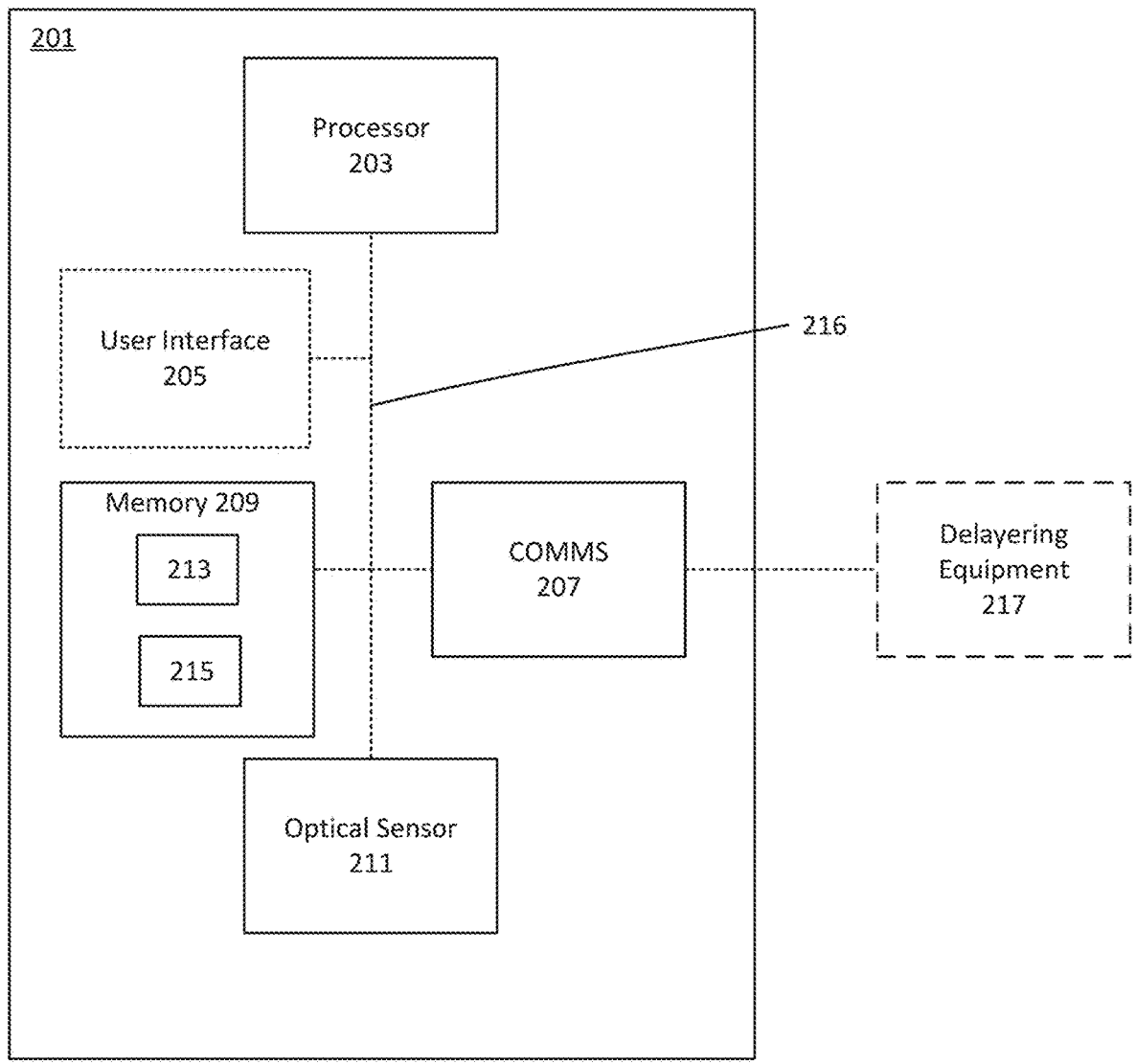
FIG. 2 is a block diagram of one example of a system for delayering IC's using optical end-point detection, in accordance with at least one embodiment of the present disclosure.

FIG. 2 is a block diagram of one example of a system for delayering IC's using optical end-point detection, consistent with the present disclosure. As shown, system 200 includes a controller 201 that is configured to communicatively couple to delayering equipment 217. Delayering equipment 217 may be any device, system, or machinery that is configured to perform one or more delayering process on an IC, e.g., one or more chemical or physical delayering processes such as those noted above. While delayering equipment 217 is shown in FIG. 2 for the sake of illustration, it is not required and thus is shown in broken lines to indicate its optional nature.

Controller 201 is generally configured to determine when a delayering process has reached a desired end-point using optical end-point detection, and in some embodiments may also control the performance of delayering process by delayering equipment 217. In that regard, controller 201 includes a processer 203, an optional user interface 205, communications (COMMS) circuitry 207, memory 209, and an optical sensor 211. Such components may be communicatively coupled to one another via a bus 216.

Processor 203 may be any suitable general-purpose processor or application specific integrated circuit. Without limitation, in embodiments processor 203 is one or more single or multicore processors produced by INTEL® corporation, APPLE® corporation, AMD® corporation SAMSUNG® corporation, NVIDIA® corporation, Advanced Risc Machines (ARM®) corporation, combinations thereof, or the like. While FIG. 2 depicts the use of a single processor 203, multiple processors can be used.

Optional user interface 205, when used, is configured to provide a mechanism for a user to interact with and configure controller 201 and/or one or more components thereof. Any suitable user interface may be used as user interface 205. For example, user interface may be or include a mechanical user interface, a graphical user interface, or a combination thereof. As described later, user interface 205 may be used to provide an indicator to a user of system 200, wherein the indicator signifies whether a delayering process has or has not reached a desired end-point.

COMMS 207 may include hardware (i.e., circuitry), software, or a combination of hardware and software that is configured to allow controller 201 to transmit and receive messages via wired and/or wireless communication to/from one or more devices, such as but not limited to delayering equipment 217 and/or optical sensor 211. Communication between COMMS 207, optical sensor 211 and/or delayering equipment 217 may occur, for example, via a wired or wireless connection using one or more currently known or future developed communication standards. COMMS 207 may include hardware to support such communication, e.g., one or more transponders, antennas, BLUETOOTH™ chips, personal area network chips, near field communication chips, wired and/or wireless network interface circuitry, combinations thereof, and the like. In embodiments optical sensor is provided separately from controller 201 and COMMS 207 is communicatively coupled to optical sensor 211 and delayering equipment 217 when system 200 is in an assembled state.

Memory 209 may be any suitable type of computer readable memory. Examples of memory types that may be used as memory 209 include but are not limited to: programmable memory, non-volatile memory, read only memory, electrically programmable memory, random access memory, flash memory (which may include, for example NAND or NOR type memory structures), magnetic disk memory, optical disk memory, phase change memory, memristor memory technology, spin torque transfer memory, combinations thereof, and the like. Memory 209 may also be or include other and/or later-developed types of computer-readable memory.

Optical sensor 211 is generally configured to image wavelengths of light in the visible region of the electromagnetic spectrum, and to output a sensor signal indicative of imaged light in that region. The nature and configuration of optical sensor 211 is not limited, and any suitable optical sensor may be used as optical sensor 211. In embodiments optical sensor 211 is in the form of or includes an optical camera that is capable of imaging wavelengths in the visible region of the electromagnetic spectrum at a desired sampling frequency, such as but not limited to 1, 10, 15, 24, 30, 60, 120, or even 240 frames per second. While FIG. 2 depicts optical sensor 211 as integral with controller 201, that configuration is not required an optical sensor 211 may be provisioned separately. In such instances optical sensor 211 may be configured to communicatively couple to controller 201, e.g., using a wired or wireless communications link with COMMS 207. In any case, optical sensor 211 is generally configured to image the surface of an IC that is being subject to a delayering process by delayering equipment 217, and to generate one or more sensor signals that include sample image data indicative of the color of the surface of the IC.

Controller 201 further includes an optical end-point (OE) module 213. In this specific context, the term "module" refers to software, firmware, circuitry, and/or combinations thereof that is/are configured to perform one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in controller 201, e.g., within memory 209 (as shown in FIG. 2) or other storage. In embodiments, OE module 213 is in the form of logic that is implemented at least in part in hardware to perform control operations consistent with the present disclosure.

OE module 213 may be configured to receive one or more sensor signals from optical sensor 211, determine a color of a surface layer of a sample IC based at least in part on the received sensor signal(s), and optionally determine the thickness of the surface layer based at least in part on the determined color of the surface layer. In embodiments and as discussed further below, the OE module 213 may determine the color and optionally the thickness of the surface layer of the IC by comparing sample image data in the sensor signal to reference image data, e.g., in calibration data 215 stored in memory 209 or at another location. Alternatively, and as also described below, OE module 213 may determine the color and optionally the thickness of the surface layer of the sample IC at least in part a machine learning model. In any case, OE module 213 may also be configured to determine whether a desired end-point of a delayering process/process has been reached based at least in part on the determined color and/or the determined thickness, and may cause controller 201 transmit control signals to delayering equipment 217 based on that determination. For example, if OE module 213 determines that the desired end-point of a delayering process/process has not been reached it may cause controller 201 to send a continue control signal to delayering equipment 217, wherein the continue control signal is configured to cause delayering equipment 217 to continue performing the delayering process/process. If OE module 213 determines that the desired end-point of the delayering process/process has been reached, however, it may cause controller 201 to send a stop control signal to delayering equipment 217, wherein the stop control signal is configured to cause delayering equipment to stop performing the delayering process/process.

As noted above OE module 213 may determine the color and optionally the thickness of a surface layer of an IC based at least in part on a sensor signal produced by optical sensor 211. The manner in which OE module 213 determines the color and/or thickness of the surface layer from the sensor signal is not limited, and any suitable method for determining color and/or thickness may be used.

In embodiments, the sensor signal produced by optical sensor 211 is indicative of the color of a surface layer of an IC that has undergone or is currently undergoing a delayering process. In such instances OE module 213 may determine the color of the surface layer based at least in part on the sensor signal. OE module 213 may then determine the thickness of the surface layer using calibration data 215 stored in memory 209 or in another location accessible to or in communication with controller 201, such as a remote server. In embodiments, calibration data 215 is a database or other data structure that correlates the color of layers of an IC to the thickness of such layers. Calibration data 215 may be previously generated by performing calibration operations that identify a correlation between the color of a material of an IC (e.g., a dielectric or other material) to its thickness. Such calibration operations may include measuring, with optical sensor 211 or another suitable sensor, reference image data from a plurality of reference IC films at various thicknesses, wherein the reference films are made of materials that are found in ICs, and preferably are found in layers of a sample IC that will be subject to a delayering process. For example, calibration operations may include providing a reference IC film formed from a material (e.g., a dielectric) with an initial thickness, and measuring and recording reference image data of the reference IC film with optical sensor 211. The calibration operations may then include successively reducing the initial thickness the reference IC film, and measuring and recording reference optical data of the reference IC film with optical sensor 211 after each successive reduction in thickness. The resolution of the reference image data may be determined at least in part by the amount by which the thickness of each reference IC film is reduced between measurements. Interpolation may also be used to calculate reference image data between two optical measurements of a reference IC film at two different thicknesses. In any case, the calibration data may correlate each set of reference data with the thickness and composition of the reference IC film from which it was measured.

Alternatively, or additionally, calibration operations may include generating synthetic reference image data for a plurality of reference IC films correlated to the thickness of such reference IC films. In this context, "synthetic reference image data" means image data that is calculated using a model of the optical properties of a reference IC film correlated to its thickness. For example, synthetic reference image data may be produced using a model of the optical reflectance of a reference IC film considering the thickness of the film.

In any case, the reference data in calibration data 215 may include reference optical data from a plurality of different reference films, thus allowing system 200 (or, more particularly, OE module 213) to determine the color and optionally the thickness of a surface layer of a sample IC, e.g., by comparing sample optical data measured from the surface layer of the sample IC using optical sensor to the reference data. For example, in embodiments calibration data may include a data structure that includes reference image data correlated with thickness and material composition for a plurality of different reference IC layers as noted above.

The reference image data may be in any suitable form, and is preferably configured to facilitate ready comparison with sample image data obtained by imaging a surface layer of an IC during or after performance of a delayering process. In embodiments the reference image data includes, for each reference IC film, a matrix of intensity values measured (or calculated) from a corresponding reference IC film, wherein each location in the matrix has a consistent and defined spatial relationship with its neighbors. The matrix structure may also include multiple layers, with each layer including intensity values that are representative of different wavelengths of light, e.g., imaged by optical sensor 211. The matrix/matrice(s) for each reference IC film may be correlated in the data structure to the thickness of the reference IC film and optionally its composition.

In such embodiments, OE module 213 may be configured to determine the color of a surface layer of a sample IC by: causing optical sensor 211 to image the sample IC and produce an optical signal including or indicative of sample image data; determining the sample image data of the imaged surface/target layer of the sample IC based at least in part on the sensor signal; and comparing the sample image data to reference image data within calibration data 215; and identifying a hit the calibration data, wherein the hit is the set of reference image data in the calibration data that most closely matches the sample image data. OE module may then optionally determine the thickness of the surface layer of the sample IC, e.g., by identifying the thickness correlated with the hit in the calibration data.

Alternatively, or in addition to using the calibration data described above, OE module 213 may employ a machine learning model to determine the color and/or thickness of a surface/target layer of a sample IC based at least in part on a sensor signal produced by optical sensor 211. For example, OE module 213 may be, include, or employ a convolutional neural network (CNN) that is trained to identify the color and optionally the thickness of a surface/target layer of a sample IC based at least on a sensor signal produced by optical sensor 211. Any suitable CNN could be used for that purpose, including but not limited to a CNN from the Keras package in Python, AlexNet, VGG-16, GoogleNet, and ResNet. Machine learning models other than convolutional neural networks may also be used. Indeed, the OE module 213 can be, include, and/or utilize any suitable machine learning model that can be trained to determine the color and/or thickness of a surface layer of an IC based on sensor signal produced by optical sensor 211. Preferably, the machine learning model is a CNN from the Keras package in Python.

In any case, the machine learning model may be trained using a training data set that correlates surface thickness (one or more material layers) with color, which may be produced from a known good device, an appropriate sampling of test IC devices, or calculated using a model of surface layer thickness versus color (in which case, the training data set may be considered synthetic training data, as compared to measured training data obtained by measurement of a physical sample). The reference image data used in the training data set may include or be in the form of a matrix of intensity values with multiple layers corresponding to different imaged wavelengths as previously described. The machine learning model may use the reference data to produce a map between input image data and an output such as color and/or thickness of an IC layer. For example, the machine learning model may produce a map between input image data and an output by applying convolutional filters to the training data set that exploit the strong correlation between adjacent pixels and translational invariance in the interpretation of relationships between neighboring pixels in the reference image data in the training data set. The machine learning model may also employ multiple convolutional layers in sequence to produce a map that can capture complex and non-linear features in reference and sample image data. The machine learning model may then use the map to determine the color and/or thickness of a surface layer of a sample IC based on sample image data obtained from the sample IC. For further details of a convolutional neural network model that can be used for this purpose, reference is made to the example at the end of this application.

As noted above, OE module may determine the color and optionally the thickness of a surface layer of a sample IC based at least in part on sensor signals produced by optical sensor 211. The OE module 213 may then determine whether a delayering process being applied to the sample IC has reached a desired end-point based at least in part on the determined color of the surface layer of the sample IC. OE module 213 may make that determination in any suitable manner. In embodiments, OE module 213 is configured to determine a color of the surface layer of a sample IC by comparing sample image data to reference data within calibration data 215; identifying a hit in the calibration data as discussed above; and then determining whether the hit is a target hit, i.e., whether the hit is reference image data identified as a desired end-point for a delayering process. Alternatively, or additionally, OE module 213 may employ a machine learning model (as described above) to determine the color of the surface layer of the sample IC under consideration, and then determined whether the determined color of the surface layer corresponds to a target color, i.e., a color of the surface layer identified as a desired end-point for a delayering process.

Alternatively or additionally, OE module 213 may be configured to determine whether a delayering process has reached a desired end-point based at least in part on a determined thickness of the surface layer of the sample IC. For example OE module 213 may be configured to determine the thickness of a surface layer of a sample IC by: comparing sample image data obtained by imaging the surface layer of the sample IC with optical sensor 211 to reference data in calibration data 215; identifying a hit in the calibration data 215 as discussed above; and identifying the thickness correlated to the hit as the determined thickness of the surface layer of the sample IC. Alternatively or additionally, OE module 213 may employ a machine learning model (e.g., a convolutional neural network model) trained to correlate image data to IC layer thickness to determine the thickness of the surface layer of a sample IC. In any case, OE module 213 may determine whether a delayering process has reached a desired end-point based at least in part on a comparison between the determined thickness of the surface layer of the sample IC to a thickness threshold (also referred to herein as a target thickness). If the determined thickness is greater than the target thickness, OE module 213 may determine that the delayering process being performed on the sample IC has not reached a desired end-point and should continue. In such instances, OE module 213 may cause controller 201 to send appropriate (continue) control signals to delayering equipment 217. If the determined thickness is less than or equal to the target thickness, however, OE module 213 may determine that the delayering process has reached the target end-point. In such instances, OE module 213 may cause controller 201 to send appropriate (stop) control signals to delayering equipment 217. In that way, controller 201 can automatically discontinue performance of a delayering process by delayering equipment 217, with minimal user involvement.

In embodiments, OE module 213 is further configured to cause controller 201 to issue a notifier configured to alert a user of system 200 whether a delayering process has or has not reached a desired end-point. For example, OE module 213 may cause controller 201 to produce a notifier on or with user interface 205. In such instances, the notifier may be an audio, visual, or audio visual indicator designed to alert a user of system 200 whether a delayering process has or has not reached a desired end-point.

Figure 3:
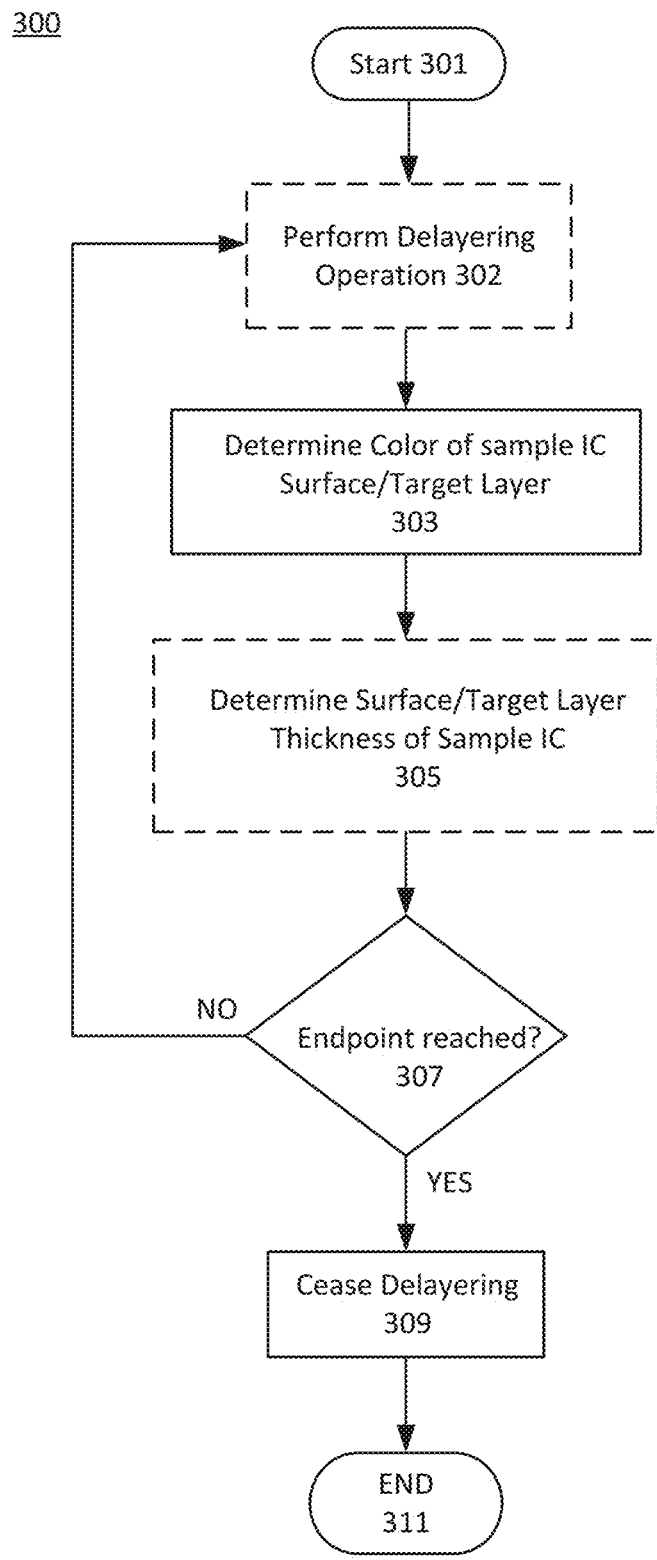
FIG. 3 is a block diagram showing illustrative operations of one example of an IC delayering method using optical end-point detection, in accordance with at least one embodiment of the present disclosure.

FIG. 3 is a flow diagram of example operations of one example of an IC delayering method using optical end-point detection consistent with the present disclosure. As shown method 300 begins at start block 301. The method then proceeds to optional block 302, pursuant to which an IC delayering process may be performed. Such operations include physical and/or chemical delayering process such as those noted above. During or following performance of the delayering process (or if the operations of block 302 are omitted) the method may proceed to block 303, pursuant to which the color of a surface layer of the IC may be determined. As discussed above, in embodiments an optical sensor (e.g., a camera) is used to image the surface of an IC during or following a delayering process and to provide one or more sensor signals indicative of the color of the surface layer of the IC to a controller or, more specifically, an OE controller module. The controller/OE controller module may determine the color of the surface layer of the IC being processed based at least in part on the received sensor signal(s).

The method may then proceed to block 305, pursuant to which the thickness of the surface layer of the IC may be determined based at least in part on the determined color. The way the thickness is determined is not limited, but as noted above in embodiments the thickness is determined using calibration data that correlates color to material layer thickness.

The method may then proceed to block 307, pursuant to which a determination may be made as to whether a process end-point has been reached. As noted above, the outcome of this determination may depend on whether the surface layer of the IC has reached a target color and/or a target thickness. For example, a controller (or OE controller module) may compare the determined color and/or thickness of the surface layer of the IC to a target color and/or thickness as described above. In the case of color, the outcome of block 307 is no if the determined color differs from the target color, but is yes if the determined color is the target color. In the case of thickness, the outcome of block 307 is no when the determined thickness is greater than the target thickness, and yes when the determined thickness is less than or equal to the target thickness. In any case, when the outcome of block 307 is no, the controller (or OE module) may determine that delayering of the IC should continue, and the method may loop back to block 302. When the outcome of block 307 is yes, however, the controller (or OE module) may determine that a delayering process has reached a desired end-point. In such instances the method may proceed to block 309, pursuant to which delayering of the sample IC may be ceased. In instances where method 300 is being performed between steps of a delayering operation, block 309 may be omitted as delayering of the sample IC is not actively being performed. In any case, the method may then proceed to block 311 and end.

EXAMPLE

The following example is provided as an illustration of a machine learning model that can be used to determine the thickness of a dielectric layer of IC device that is being subject to a delayering process. In this example an ARM microcontroller (model STM32) device was depackaged using fuming nitric acid to remove the epoxy packaging and copper paddle on the device. The resulting bare die was mounted to a polishing fixture with the circuit layers facing up and held in place with an adhesive. A delayering operation was performed by polishing the device for a few seconds using an ALLIED MULTIPREP™ polishing system using a 0.5 µm grit diamond lapping film, after which the device was cleaned with deionized water, blown dry with nitrogen gas, and optically imaged with a Keyance VHX-7000 digital optical microscope. The same delayering operation was the performed iteratively until the entire device was delayered through 4 aluminum metal layers with a total thickness of about 4 µm. A focus during delayering was to slowly polish through the dielectric layer between each metal layer on the device down through the device stack, allowing image data of the dielectric layers to be captured at various thicknesses. As the dielectric layers were slowly thinned by the delayering operations, the color of such layers changed as described above.

Figure 5:
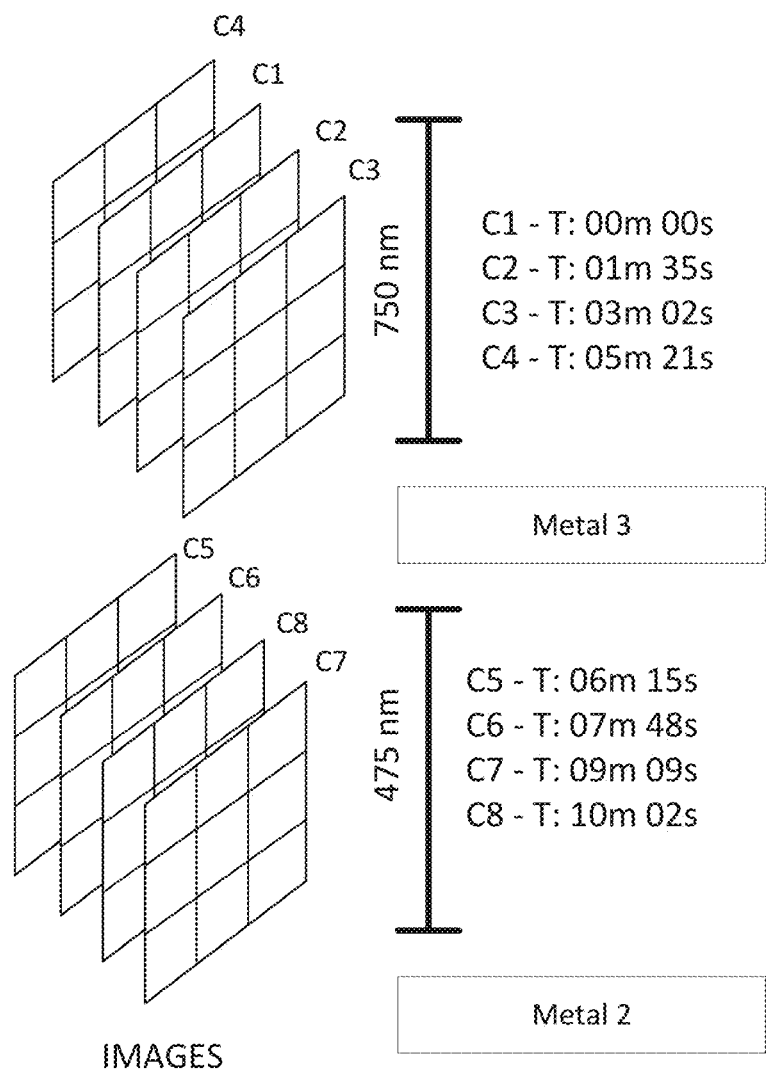
FIG. 5 depicts one example of annotation of training image data for a neural network model, in which image data grouped by metal layer is annotated with depth estimates and total polishing time.

A convolutional neural network (CNN) model for identifying the thickness of dielectric layers in a sample device was developed using the Keras python package, and was trained using an Nvidia Titan X GPU using optical images (i.e. image data) of the surface of the STM32 device as following one or more delayering operations as a training data set. As shown in FIG. 5, the surface of the STM32 device changed color as the delayering operations were performed. More specifically, the surface of the STM32 device had a first color C1 before an initial polishing process was performed. The color of the surface changed from C1 other colors (C2-C8) as the polishing process was performed. The optical images from the delayering operations were grouped by underlying metal layer and represented as a matrix of intensity values annotated with total polishing times as shown in FIG. 5. The groupings and annotations were appended with cross sectional measurements of the distance between metal layers (in this case, 750 nm and 475 nm) to produce depth estimates for each optical image indicative of the thickness of the relevant dielectric layer as also shown in FIG. 5. During training, the image depth estimate was assigned uniformly to each location with the image. A rectangular region in the center of each optical image was identified for model training and testing. That region contained a broad range of sample features and had a uniform color, indicating that the region was flat.

The CNN model was constructed to use a 39×39 pixel region around each point as an input, pass the input through several convolutional layers, and the several fully connected layers to create a depth prediction model. Relu activation functions were used for all nodes in the network. Dropout regularization was applied between all convolutional layers, and l2 regularization was used on the second fully connected layer. The Adam optimizer and a mean squared error loss function were used to tune the model weights. A pre-processing function was used to replace dark colored pixels with the medial color of the surrounding dielectric material.

Figure 6:
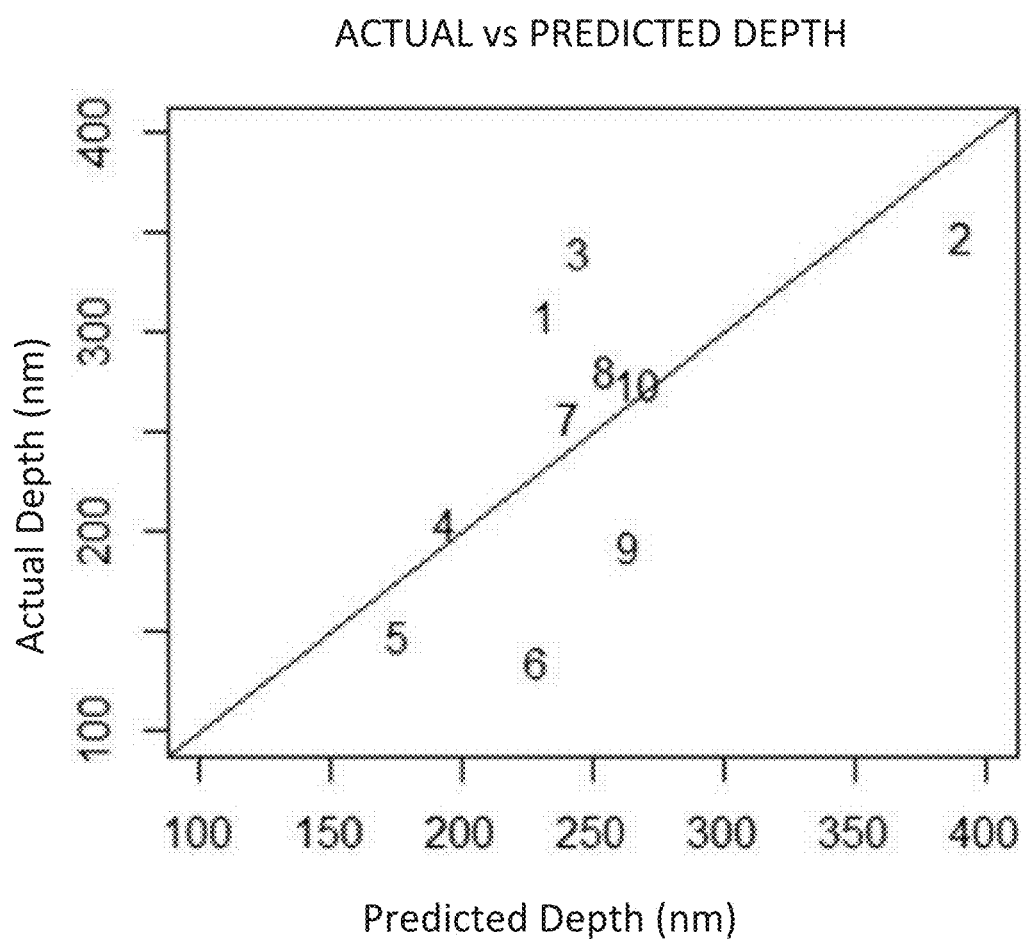
FIG. 6 is a plot of actual depth of an IC dielectric layer vs predicted depth produced by a convolutional neural network model consistent with the present disclosure.

Hyperparameter tuning was employed to optimize the preprocessing and model parameters. One particularly useful model consisted of five 32 filter convolutional layers, each followed by 10% dropout layers, followed by fully connected layers of 128, 64, 32, and 1 neuron(s). That CNN model was tested for internal To evaluate performance of the neural network model, a second sample STM32 device was delayered in the same manner as described above to expose an oxide (dielectric) layer. Image data from 10 locations of the exposed dielectric layer were fed into the CNN model, which output predicted thicknesses for the dielectric layer at those locations based on the color of the dielectric at the tested locations. The sample was then loaded into a Thermfisher Scientific HELIOS G4Uxe Plasma Focused Ion Beam (PFIB) scanning electron microscope, for cross sectioning and measurement of the dielectric thickness at those same locations. The cross sections at each location were created using a 30 kV ion beam at 15 nA, followed by 4 nA. SEM images of the cross sections were then taken and the dielectric film thicknesses at each location were measured. The results of the thickness measurements (actual thickness) and the predicted dielectric thicknesses (predicted depth) produced by the model are shown in FIG. 6. As shown, the CNN model was able to correlate dielectric film color to remaining material thickness with a mean absolute error of about 47 nm. The strong correlation between the actual and predicted depth values demonstrates the promise of the CNN model to be used to accurately determine an end-point of a delayering process.

As used herein the term "about" when used in reference to a value or a range means +/−5% of the indicated value or range.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A system for delayering integrated circuits (ICs), comprising an optical sensor and a controller, the controller comprising a processor, a memory comprising an optical end-point (OE) module, and communications circuitry; wherein:
   the communications circuitry is configured to communicatively couple with delayering equipment that is configured to perform a delayering process on an IC;
   the sensor is configured to image a surface of an IC during or after execution the delayering process by said delayering equipment, and to transmit a sensor signal indicative of a color of a surface layer of the IC to said controller;
   in response to said sensor signal, the OE module is configured to cause the controller to:
      determine the color of the surface layer of the IC;
      determine a thickness of the surface layer of the IC based at least in part on the determined color; and
      determine whether an end-point of said delayering process has been reached based at least in part on the determined thickness.

2. The system of claim 1, wherein the memory comprises calibration data stored therein, and the OE module is configured to cause the controller to determine the thickness of the surface layer using said calibration data and said determined color of the surface layer.

3. The system of claim 1, wherein the OE module is configured to cause the controller to determine whether an end-point of said delayering process has been reached at least in part by comparing the determined thickness to a target thickness.

4. The system of claim 3, wherein when the determined thickness is greater than the target thickness, the OE module is configured to cause the controller module to determine that the end-point of the delayering process has not been reached.

5. The system of claim 3, wherein when the determined thickness is less than or equal to the target thickness, the OE module is configured to cause the controller module to determine that the end-point of the delayering process has been reached.

6. The system of claim 1, wherein the OE module is configured to determine the thickness of the surface layer of the IC using a machine learning model.

7. The system of claim 6, wherein the machine learning model is a convolutional neural network (CNN) model.

8. The system of claim 1, wherein the surface layer of the IC comprises a dielectric material.

9. The system of claim 8, wherein the dielectric material comprises $SiO_2$, $SiO$, $SiO_x$, or a combination of two or more thereof.

10. The system of claim 3, wherein the OE module is further configured to cause the communications circuitry to issue a control signal to the delayering equipment, wherein the control signal is configured to cause the delayering equipment to continue performance of the delayering operation when the determined thickness is greater than the target thickness, and to stop performance of the delayering operation when the determined thickness is less than or equal to the target thickness.

11. A method of delayering an integrated circuit (IC), comprising:
   imaging, with an optical sensor, a surface of an IC during or after performance of a delayering process by delayering equipment and producing a sensor signal indicative of a color of a surface layer of said IC;
   receiving the sensor signal with a controller comprising a processor and a memory comprising an optical end-point (OE) module; and
   with the OE module:
      determining the color of the surface layer based at least in part on the sensor signal;
      determining a thickness of the surface layer based at least in part on the determined color; and
      determining whether an end-point of the delayering process has been reached based at least in part on the determined thickness.

12. The method of claim 11, wherein determining the thickness of the surface layer is performed using calibration data stored in the memory of the controller and said determined color of the surface layer.

13. The method of claim 11, wherein determining whether the end-point of the delayering process has been reached comprises comparing the determined thickness to a target thickness.

14. The method of claim 13, wherein when the determined thickness is greater than the target thickness, the OE module determines that the end-point of the delayering process has not been reached.

15. The method of claim 8, wherein when the determined thickness is less than or equal to the target thickness, the OE module determines that the end-point of the delayering process has been reached.

16. The method of claim 11, wherein determining the thickness of the surface layer is performed with a machine learning model.

17. The method of claim 16, wherein the machine learning model is a convolutional neural network (CNN) model.

18. The method of claim 11, wherein the surface layer of the IC comprises a dielectric material.

19. The method of claim 18, wherein the dielectric material comprises $SiO_2$, $SiO$, $SiO_x$, or a combination of two or more thereof.

20. The method of claim 13, wherein the controller further comprises communications circuitry, and the method further comprises causing the communications circuitry to issue a control signal to the delayering equipment, wherein the control signal is configured to cause the delayering equipment to continue performance of the delayering operation when the determined thickness is greater than the target thickness, and to stop performance of the delayering operation when the determined thickness is less than or equal to the target thickness.

* * * * *